(12) United States Patent
DeRoo (10) Patent No.: US 6,295,581 B1
(45) Date of Patent: Sep. 25, 2001

(54) METHOD AND APPARATUS FOR ASSURING CACHE COHERENCY

(75) Inventor: John E. DeRoo, Marlborough, MA (US)

(73) Assignee: ATI Technologies, Inc. (CA)

( * ) Notice: Subject to any disclaimer, the term of this patent is extended or adjusted under 35 U.S.C. 154(b) by 0 days.

(21) Appl. No.: 09/026,942

(22) Filed: Feb. 20, 1998

(51) Int. Cl.[7] ............................. G06F 12/00; G06F 13/00
(52) U.S. Cl. ........................ 711/135; 711/147; 710/53; 710/56; 710/52
(58) Field of Search ..................................... 711/135, 137, 711/147; 710/52, 53, 56, 57

(56) References Cited

U.S. PATENT DOCUMENTS

| | | | |
|---|---|---|---|
| 5,526,510 | * | 6/1996 | Akkary et al. ............... 395/460 |
| 5,586,294 | * | 12/1996 | Goodwin et al. ............ 395/464 |
| 5,606,686 | * | 2/1997 | Tarui et al. .................. 395/448 |
| 5,745,730 | * | 4/1998 | Nozue et al. ................ 395/462 |
| 5,749,091 | * | 5/1998 | Ishida et al. ................. 711/135 |
| 5,778,430 | * | 7/1998 | Ish et al. ...................... 711/133 |
| 5,829,030 | * | 10/1998 | Ishida et al. ................. 711/135 |
| 5,895,485 | * | 4/1999 | Loechel et al. .............. 711/119 |

\* cited by examiner

Primary Examiner—Matthew Kim
Assistant Examiner—Pierre M. Vital
(74) Attorney, Agent, or Firm—Vedder, Price, Kaufman & Kammholz (57) ABSTRACT

Access to memory is facilitated by a cache memory access system that includes individual buffers for storing and processing data access commands asynchronously, while also assuring data coherency and avoiding deadlock. Data access commands are placed in discrete buffers, in dependence upon their type: read and write to and from a client process, fill from memory, and flush to memory. To maintain data coherency, the read and write commands are processed substantially sequentially. To optimize memory access, fills are processed as soon as they are submitted, and flushes may be given lower priority than fills. To avoid deadlock, fills are generated so as to be independent of all other commands. The use of discrete buffers for cache memory access is particularly well suited to pipeline processes.

23 Claims, 8 Drawing Sheets

METHOD AND APPARATUS FOR ASSURING CACHE COHERENCY

TECHNICAL FIELD OF THE INVENTION

This invention relates generally to the use of cache memory in computer systems and more particularly to cache memory for image and video processing systems, database access systems, Computer Aided Design systems, and the like.

BACKGROUND OF THE INVENTION

Figure 1:
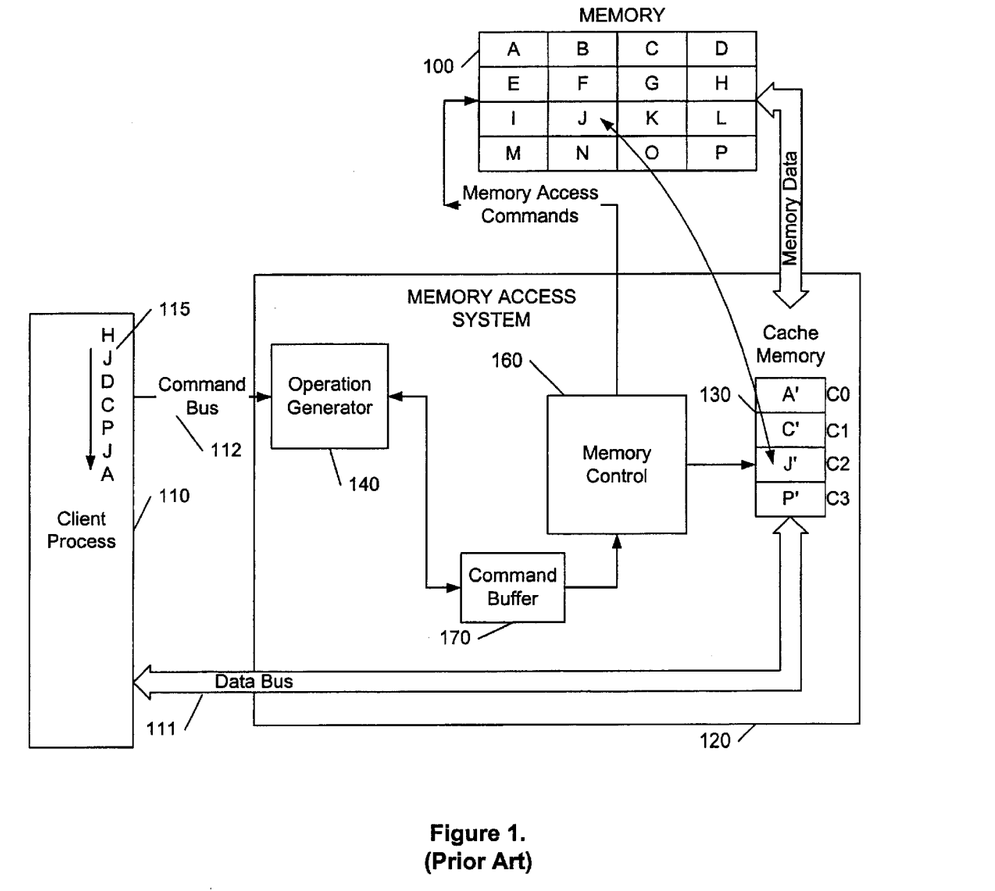
FIG. 1 illustrates a block diagram of a conventional cache memory access system.

Cache memory is used to optimize computer system performance by temporarily storing data in memory devices that allow for high speed access, in comparison to data retrieval from low speed memory such as disks or tapes. Cache memory is used to mirror the data in the low speed memory so that each access to the data is effected as an access to the high speed cache memory, thereby avoiding the latency associated with an access to the low speed memory. The initial access to the data incurs the latency time loss to access the data from the low speed memory, but once the data is stored in the cache, subsequent accesses to the data are via the high speed cache access. The cache is structured to mirror a block of memory, so that subsequent access to data in proximity to the initially accessed data is also via the high speed cache access. Cache memory is conventionally structured to provide access to multiple blocks of memory. As shown in FIG. 1, blocks C0, C1, C2, and C3 form cache memory areas within a cache memory 130.

FIG. 1 represents a conventional processing system with indexed cache memory. The client process 110 accesses data contained in the memory 100 via the memory access system 120. The client process 110 communicates a stream of data commands 115 via the command bus 112, and the data associated with the command stream 115 is communicated via the data bus 111.

The memory access system 120 contains a cache memory 130 partitioned into cache locations C0, C1, C2, and C3. Each of these cache locations is capable of storing a copy of a block of memory A, B, C, etc. of memory 100. The cache memory 130 has a speed of access, which is substantially greater than the speed of access of memory 100. By storing copies of the blocks of memory 100 in the cache memory 130, substantial access speed improvements can be achieved when multiple accesses to the data within a block occur.

The data commands from the client process 110 are received by the operation generator 140 within the memory access system 120. The client data commands direct a transfer of data to or from a memory address, such as a read or write of data, or a combination, such as read-modify-write of data. The operation generator 140 generates a series of commands applicable to the memory control 160 and the memory 100 to accomplish each client data command. The operation generator interprets the data command to determine which memory block A, B, C, etc. of memory 100 includes the requested memory address. It also determines whether a copy of the identified memory block is already contained in the cache memory 130. If the memory block is in the cache memory, the operation generator identifies which cache location C0, C1, etc. contains the copy of the memory block, and formulates a command to effect the data command with this identified cache location.

If the memory block is not contained in the cache memory, the operation generator allocates one of the cache locations to this memory block. Typically, the allocated cache location will have been allocated to another memory block prior to this data command. Therefore, the operation generator must determine whether some action must be taken with regard to the data currently stored in the identified cache location. If, for example, the copy of the data in the cache location had only been used for reading the data contained in a memory block, no action need be taken, and the new memory block data will merely overwrite the prior data. If, however, new data had been written to this cache location, intending to be written to the associated memory block, the copy of the data in the cache location must be written to the memory block before the new memory block data is read into this cache location. Thus, in this case, the operation generator will formulate a command to write the data in the cache location to its previously associated memory block, followed by the command to read the new memory block into this cache location. The command to write data from the cache location to the memory is termed a "flush" of the cache location; the command to read data into the cache location from the memory is termed a "fill" of the cache location.

When the cache memory is full and another request arrives, the operation generator allocates one of the cache locations to the new request. A variety of allocation algorithms can be applied to determine which cache location is to be reallocated, such as least recently used algorithms, indexed algorithms, and others. Before the operation generator reallocates one of the cache locations, it first determines that the data contained in the cache location is no longer needed. Typically, the data will be needed if it has been modified and the modifications have not been written back to memory. If the data has not been written back to the memory, the new data request cannot be processed in the cache location until the modified data has been written back to the memory. While this writing occurs, the processing of the data request is halted, which, depending on the nature of the data, may completely halt the processing of the computer system.

There are several techniques to minimize the occurrence of a processing halt. For example, in a pipeline process, memory access requests are provided a few stages ahead of when the data is needed. But, if the data is not available when it is to be processed, the process is halted until the data is available. By providing stages between the request and the data availability, the memory access system is provided time to obtain the data from the slower memory, and therefore, the likelihood of the client process having to be halted is reduced.

Another technique is to "spawn", as sub-processes, current and subsequent commands before they are completed. The asynchronous nature of spawned processes, however, requires control in the sequencing of the spawned commands. Consider, for example, a command to flush modified data, followed by a command to fill from the same memory block. If the fill and flush commands are processed asynchronously and in parallel, the fill may occur before the flush. If the fill occurs before the flush, the modified data in the cache location will be overwritten by the data filled from memory, and will be incorrect. To avoid the potential errors caused by spawned processes, the commands and data must be processed in a coherent manner.

A direct means of assuring data consistency is to force a strict ordering of the sequencing of commands, and precluding the execution of a command until the preceding command has been completed. This purely sequential processing, however, is inefficient, because not all commands are dependent upon one another. For example, if a read command follows a flush command, there is no need to delay the execution of the read command until the flush command completes.

The processing of commands, even with dependency checks, must still occur sequentially, to avoid to memory deadlocks. That is, for example, when all the cache location are allocated and a new read request arrives, the dependency check will hold the read pending until one of the cache locations is flushed. The flushing of a cache location is held pending until the completion of the read or write requests to this cache location. Unless tight controls are placed on the ordering and processing of read, write, fill, and flush operations, the flushing of a cache location can become dependent upon the completion of a read request which is pending dependent upon the completion of this flushing, thereby resulting in a deadlock situation, precluding subsequent processing.

In a conventional cache system of FIG. 1, the command buffer 170 is a first-in first-out (FIFO) buffer, thereby assuring the proper sequencing of commands, the dependency checks are applied to each command as it is removed from the FIFO. If a command is dependent on a preceding command, the memory controller merely waits until the preceding command completes before commencing the execution of the subsequent command.

The sequential nature of the FIFO command buffer 170, however, introduces performance penalties upon all the commands within the FIFO. That is, while the command buffer 170 pauses to wait for the completion of a command, none of the commands in the command buffer are being executed, even if they could be executed without affecting the data coherency. When these commands arrive at the output of the FIFO, they will be immediately executed, but in the meantime they have incurred the delay caused by the dependent previous commands. Additionally, as is evident in the above description, the specific sequencing of commands is determined by the sequence of the arriving commands from the client process. As such, sequences which may provide for a more optimal memory access cannot be realized.

Therefore, a need exists for a method and apparatus that maintains the necessary order and control on the processing of commands to assure data consistency, but does not impose a cumulative delay on the processing of commands, and does not cause memory access deadlocks. A need also exists for a method and apparatus, which allows for command processing optimization without regard to the particular ordering of commands from the client process.

DESCRIPTION OF THE PREFERRED EMBODIMENTS

Generally, this invention presents a method and apparatus for cache memory management that is efficient and effective for optimizing access to memory data, and is, by design, deadlock-free. The cache management system includes a multitude of independent command buffers: a fill buffer, a flush buffer, and a memory command buffer. Each command of a particular type is placed into a buffer associated with that type of command. Each buffer is processed in parallel, to optimize performance, and in a manner which eliminates the possibility of a memory deadlock.

In an embodiment of this invention, independent buffers are allocated for the following types of commands: memory command (read/write), fill, and flush. The allocation of cache memory is such that a fill command is processed independent of all other commands in its buffer and each of the other buffers. In this manner, it is assured that the fill commands can be processed quickly, and will not be deadlocked or delayed by other commands. Commands in the memory buffer are strictly ordered, in a first-in, first-out (FIFO) order, and, at the output of the buffer, are dependent upon commands in the fill buffer, and independent of commands in the flush buffer. Because the commands are processed in a first-in first-out order, this ordering assures a coherent processing of the memory commands. Because the fill buffer cannot be deadlocked or delayed by other commands, the memory command buffer cannot be deadlocked and the commands will only be delayed by the dependencies required for data coherency. In addition, the flush buffer is dependent upon the memory command buffer, which cannot be deadlocked, and therefore the flush buffer cannot be deadlocked. Because commands in the buffers cannot be deadlocked by other commands, the cache system in accordance with this invention is deadlock-free. Because fills, from the slower memory, are processed independent of the sequential read and write commands, they can be processed ahead of the order in which they appear from the operation generator, thereby taking advantage of whatever lead time is provided by pipeline architectures.

In another embodiment, the memory command buffer comprises two buffers: a read/write buffer and a write buffer. These buffers are structured to have non-deadlocking architectures. By separating the processing of write commands into a separately processable write buffer, further performance benefits can be realized, by optimizing the processing of read commands which affect the client process, and by easing the task of searching for write commands, as will be discussed below.

Figure 2:
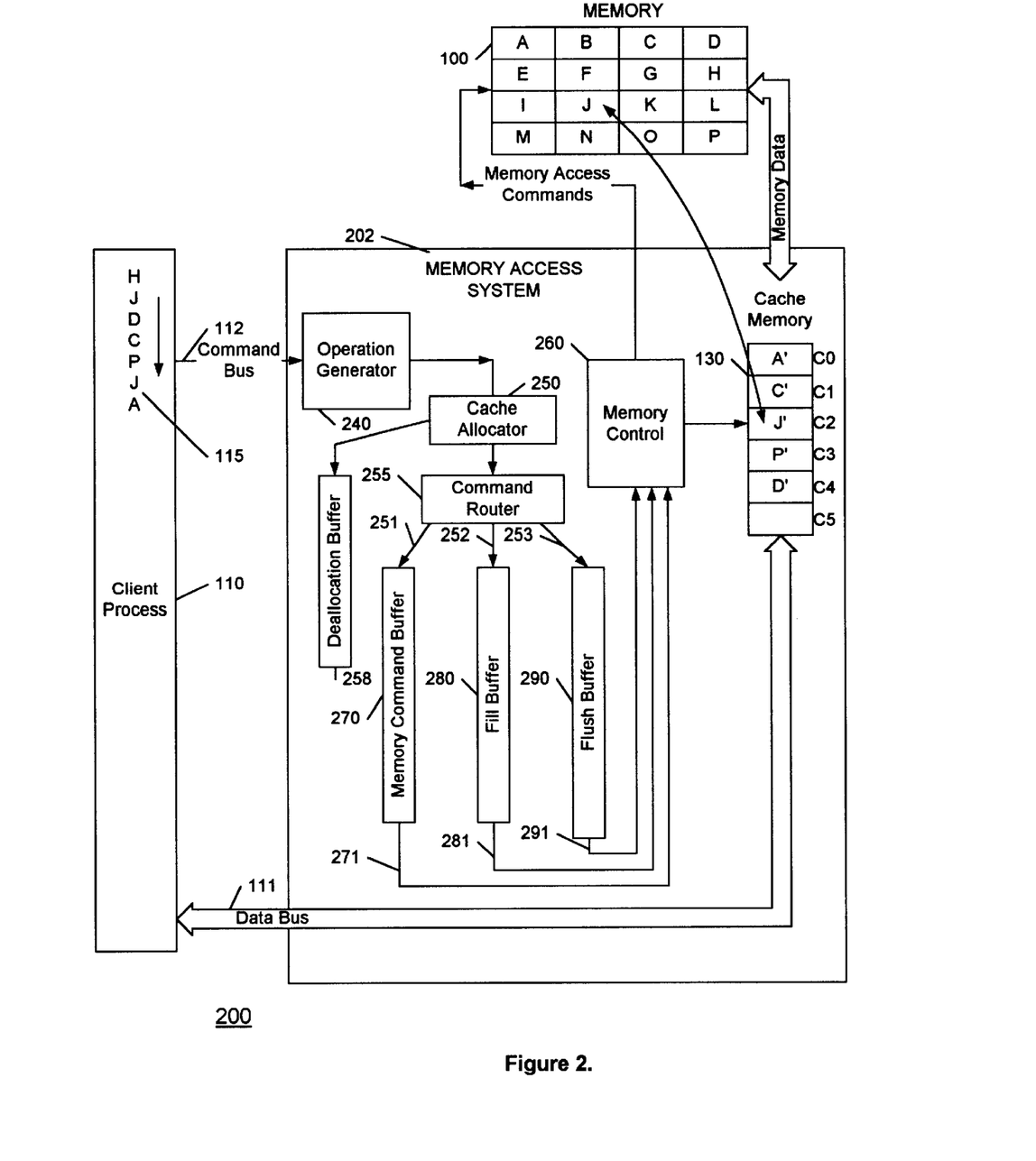
FIG. 2 illustrates a block diagram of a cache memory access system in accordance with this invention.

FIG. 2 illustrates a block diagram of a data processing system 200 that includes a client process 110, cache memory access system 202, and memory 100. The operation generator 240 receives data commands from the client process 110, and formulates therefrom commands with reference to logical indices to the cache memory 130, rather than a reference to a specific cache location. The operation generator 240 determines when a new allocation of cache is required to satisfy the current data command; this is communicated to the cache allocator 250. This new allocation, however, is a new allocation of the aforementioned cache logical index, rather than an allocation of an actual cache location. The cache allocator 250 allocates a free physical cache index to the cache logical index. A physical cache index is associated with each actual cache location. The free physical cache index is known, by definition, to be associated with a cache location which does not have outstanding operations pending. The prior association of a memory block to a physical cache index is retained, in a deallocation buffer 258, until the operations related to the cache location identified by the physical cache index are completed. In this manner, new data commands are not delayed while the data related to the prior data commands are cleared from the cache location. If a free physical index is not available at the time the command reaches the cache allocator 250, the command is held pending until a cache location and its associated physical index become free. Spare cache locations, that is, cache locations in excess of the number of logical indexes, are provided to increase the likelihood of a free cache location being available, thereby minimizing the likelihood of having to hold a command pending. When all operations on the memory block and cache location associated with a physical index in the deallocation buffer 258 are completed, the cache allocator severs the association and marks the cache location and associated physical index as being free.

It is to be noted that the logical to physical mapping as described above provides for enhanced performance, but is not critical to the design in accordance with this invention. As discussed below, the manner in which the logical to physical mapping is effected allows the fill requests to be independent of the other commands. Any mapping of memory blocks to cache locations which provides for independent fill requests can be utilized, as well as mappings which produce dependent fills if suitable means are included to avoid deadlock. Similarly, although the operation generator 240 and cache allocator 250 blocks are shown as separate entities, for clarity, the function of the cache allocator 250 can be integrated within the operation generator 240, as can the command router 255, discussed below.

The command router 255 routes the commands generated by the operation generator 240, as modified by the cache allocator 250, to buffers 270, 280, and 290 depending upon their type. Memory commands (read and write commands) are stored in memory command buffer 270 via path 251; fill commands are stored in fill buffer 280 via path 252; and flush commands are stored in flush buffer 290 via path 253.

Note that, for ease of understanding, a simple command structure is presented herein. It is assumed that the client commands comprise read and write commands. A read-modify-write command will be recognized by one of ordinary skill in the art as the combination of a read command and a subsequent write command. Similarly, fills and flushes are presented herein as copying an entire memory block to and from a cache location. In practice, a merge memory command is a flush command with specified elements in the cache identified to replace their corresponding memory elements, while the remaining memory elements are left unaffected. The merge command will be recognized by one of ordinary skill in the art as being equivalent to the flush command discussed herein, relative to the specific memory elements being affected. Also, in practice, memory may be accessible in sub-block sizes and the fills and flushes discussed herein will be further optimized to only fill and flush to the sub-blocks requiring a fill or a flush. These and other memory access optimization techniques are well known to those of ordinary skill in the art and will not be further detailed herein.

The operation generator 240 formulates a fill command whenever a read from a new memory block is required. A fill is also required whenever a write to a new memory block is required, if the system does not provide for a merge-flush, discussed above. This "new" memory block is a new assignment of this memory block to a logical index; it may well be that the memory block is still contained, in an unmodified form, in one of the cache locations, from a prior access. Before assigning a free cache location to this logical index, the cache allocator 250 searches the deallocation buffer 258 to determine if the block is still associated with a physical cache index. If it is associated with a physical cache index, this physical cache index is reallocated to the logical index, the entry in the deallocation buffer 258 is removed, and the fill command is not propagated to the command router 255, nor the fill buffer 280. If the memory block is not currently in cache, the cache allocator 250 assigns one of the free physical indexes to the logical index, and submits a fill command to the command router 255. The command router 255 routes the fill command to the fill buffer 280, instructing that the cache location at this index be filled from the memory block associated with the logical index.

Thus, a fill will always be to a free cache location, and no operations can be pending for this memory block. Therefore, any and all fill commands can be executed without waiting for another command to complete. The fill buffer 280 cannot be deadlocked, and cannot be delayed by other commands. Because the fill commands are independent, they may be processed by the memory controller 260 without regard to a particular ordering of the commands. Because a fill, from the slower memory 100, has the potential of directly impacting the client processor 110, the preferred embodiment of memory controller 260 will process fill commands independent of other commands. Memory access is thereby optimized, because the fill commands are not delayed in a queue behind other non-fill commands, and will be processed as fast as the memory 100 allows.

A read or write command is formulated in response to a read or write data command of the command stream 115 from the client process 110. The operation generator 240 formulates the read and write commands with reference to the data location in cache memory 130, not the location in memory 100. To assure that the proper data is read from the cache location, the read command should not be executed if there is either a prior write or fill pending for this cache location. A read will not be executed if a prior write is pending. The memory commands to the same cache location are processed in the order in which they are received; thus, any prior write command will be known to have been initiated before the read command. Read and write commands transfer data to and from the cache 130 via the data bus 111; as such, they execute quickly. This allows the commands from the memory command buffer 270 to be executed strictly sequentially, such that one command is not executed until the prior command is completed, thereby preserving data coherency without adversely affecting system performance.

A read command will not be executed until the fill command to its assigned cache location is completed. Because fill commands are completed as quickly as the memory 100 allows, the read command will be processed as efficiently as possible. The client process 110 expects the requested data to appear on the data bus 111 in the order in which it was requested 115, and therefore optimizing the processing of subsequent reads will have little, if any, advantageous effect on the client process 110. Although subsequent reads will be delayed in the memory command buffer 270 by any delay incurred waiting for a fill, the delays will not necessarily be cumulative. The fills associated with these subsequent reads will have been submitted to the fill buffer 280 and initiated by the memory control 260 when the subsequent reads entered the memory command buffer 270. Thus, the delay of one fill/read will allow more time for the subsequent fills to be completed before the associated reads appear at the output of the memory command buffer 270, and the likelihood of repeated delays due to slow memory access is substantially reduced.

In general, write commands will not be executed if there are any pending fills to the same cache location, because if a pending fill occurs after the write command, the data written to the cache location from the client process 110 will be overwritten by the fill from the memory 100. Because fill commands are preferably processed as soon as they are received, and are known to be deadlock-free, fills to the cache location will be completed as quickly as the memory 100 allows, and thus, the write command will be processed efficiently. In some systems, modified data in a cache is flagged, and the fill process does not overwrite modified data. In such systems, the write command will modify the data in the cache, causing it to be flagged, and thus be independent of all other commands. In such systems, the write command will execute as soon as it appears at the output of the memory command buffer 270.

Flush commands will not be executed if there are any pending writes to the same cache location. As contrast to the conventional system, once a flush command is placed in the flush buffer 290, its time-association with the memory commands is severed. That is, the memory control 260 will be unable to determine when this flush occurred relative to commands in the other buffers 270, 280 via 281 and 291. Thus, a "pending write" may be a prior write or a subsequent write. If a prior write does not complete before the flush command, the data written to the memory from the cache location will not contain the data of the prior write, and will not be a proper flush. Therefore, forcing the flush to be dependent upon a prior write is required. If a subsequent write is pending, there is no harm done by flushing after this write, because the write was intended for the memory as well. Therefore, forcing the flush to be dependent upon a subsequent write is optional. Thus, the memory control 260 need only search the memory command buffer for writes to this cache location; the flush command is not executed until the memory command buffer 270 is clear of writes to this cache location. If desired, a "force flush" command can be provided, to force a flush without regard to pending prior or subsequent writes, to assure, for example that the data is actually stored to memory periodically, in the event of an unexpected failure.

Because write commands are known to be deadlock-free, eventually all writes to this cache location will be completed, and the flush command will execute. Thus, although some flush commands will be delayed by subsequent writes, the flush command is assured to be deadlock-free.

Upon completion of all outstanding operations on a cache location and memory block identified in the deallocation buffer 258, the physical index is marked as being free. If, after being identified as a deallocated block, a subsequent command affects the memory block, it will be removed from the deallocation buffer 258, and the physical index will be allocated to the logical index associated with this new request. Thus, a free cache location will only be requested for a new memory block access. Because each of the commands are assured to be deadlock-free, the availability of a free physical index and associated cache location will be deadlock-free, and therefore the allocation of new memory blocks to free physical indexes will be deadlock-free.

Thus, as shown, because each type of command is deadlock-free, and the function of the cache allocator 250 is deadlock free, the entire memory access system 202 will be deadlock-free, even though it provides for the asynchronous processing of each of the memory access (fill/flush) commands. By providing the asynchronous processing of each of the memory access commands, the available time from the receipt of the data command from the command bus and the presence of the data on the data bus can be efficiently and effectively utilized. Further, by providing unconstrained fill commands, fill commands can be given higher priority than flush commands, thereby optimizing the memory access for operations which directly affect the client process performance. Further optimizations can be provided within the spirit and scope of this invention as well, as would be evident to one skilled in the art. For example, fill requests related to a read can be given higher priority than fill requests related to a write. Similarly, if the memory 100 is distributed over memory devices having different access times, for example a database which includes locally stored data and network stored data, the fill from the slowest device can be given priority, so that it is provided the maximum available time from receipt of the data command from the client process.

Figure 3:
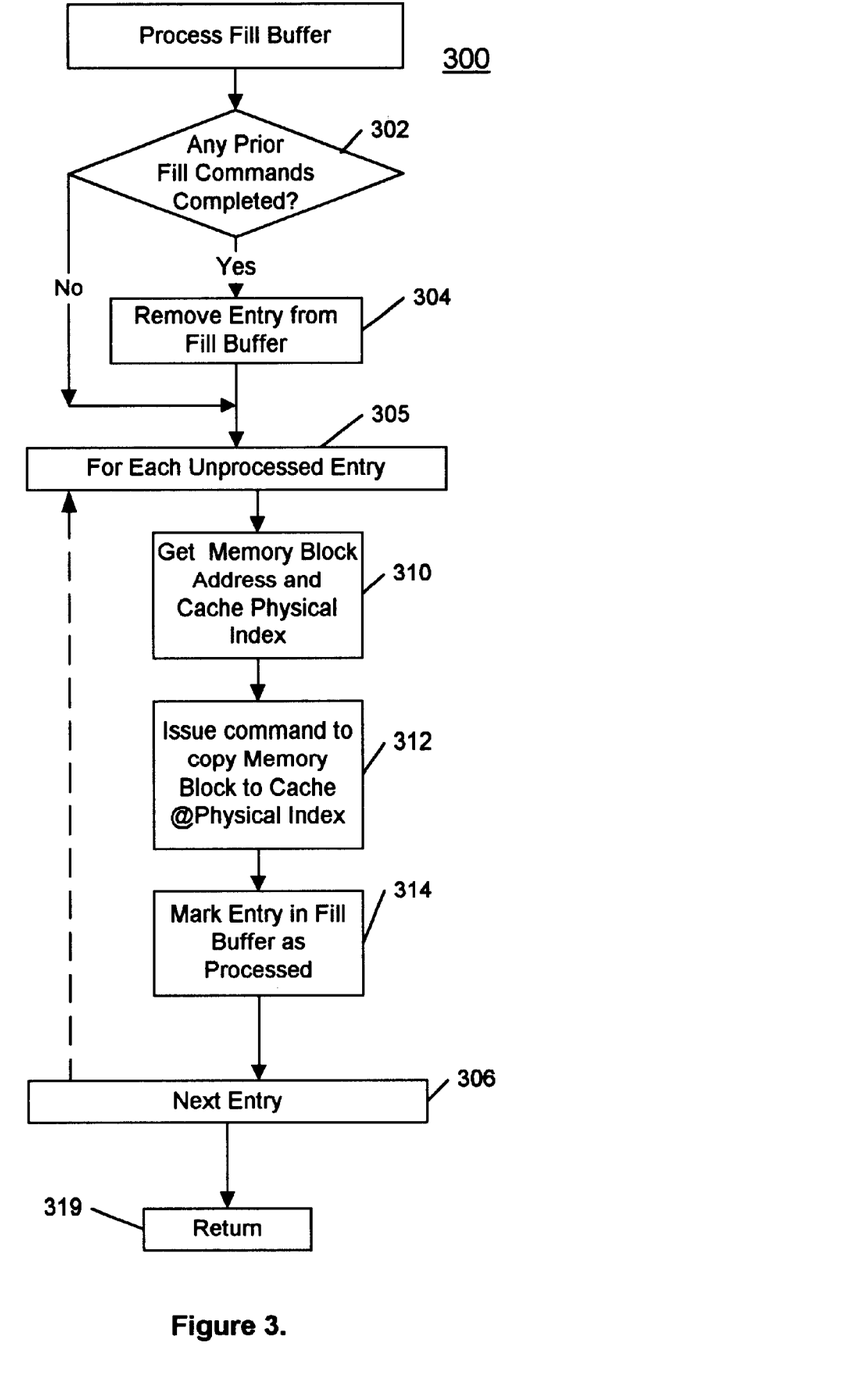
FIG. 3 illustrates a flow chart for processing fill commands in accordance with this invention.
Figure 4:
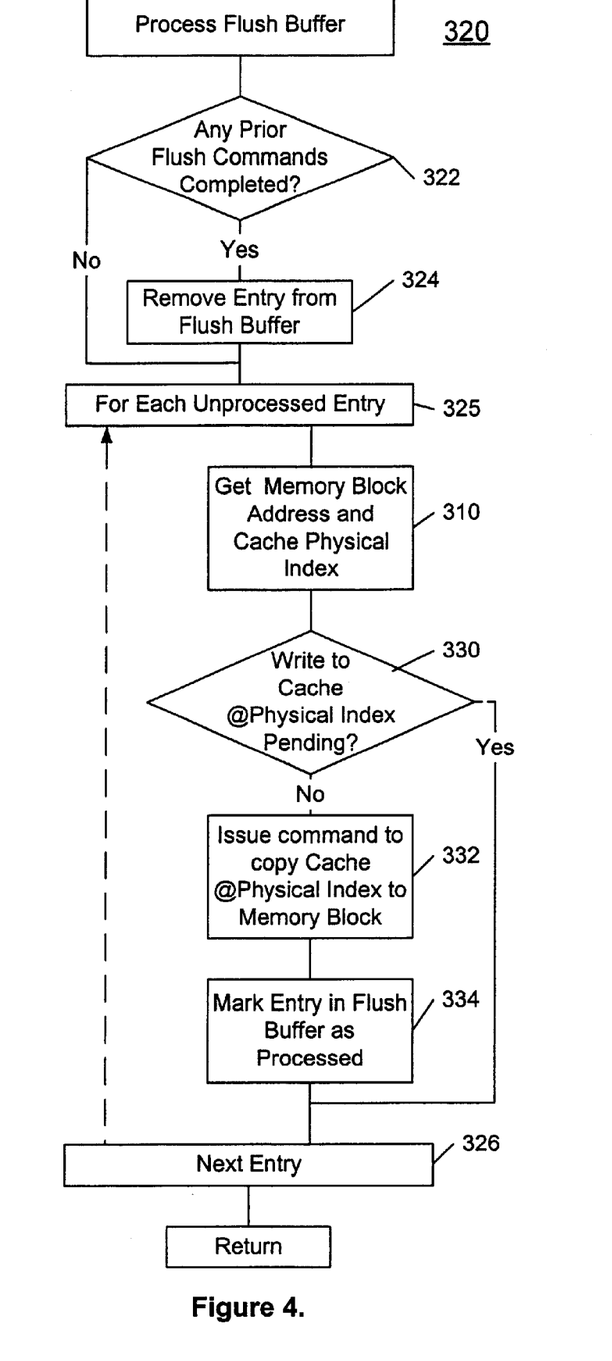
FIG. 4 illustrates a flow chart for processing flush commands in accordance with this invention.
Figure 5:
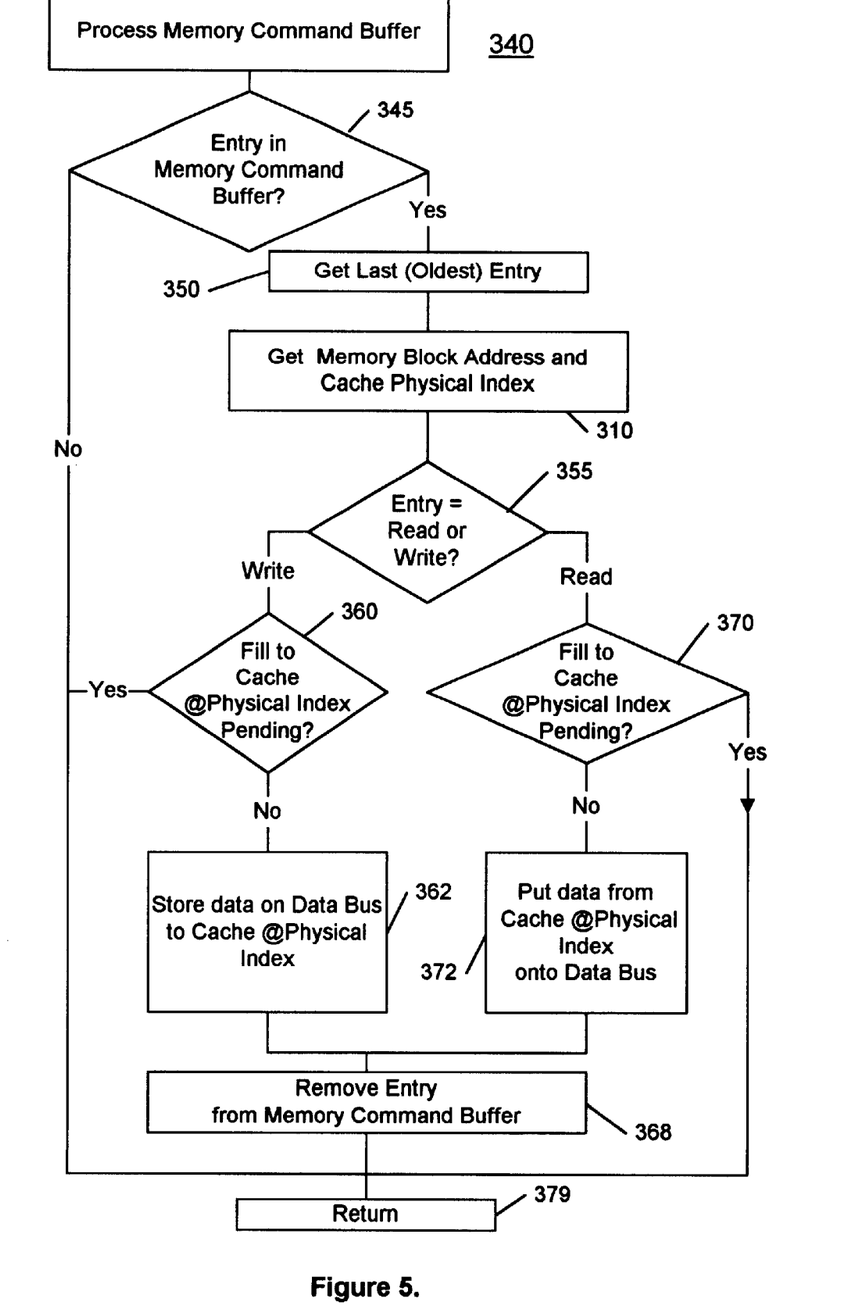
FIG. 5 illustrates a flow chart for processing memory commands in accordance with this invention.
Figure 6:
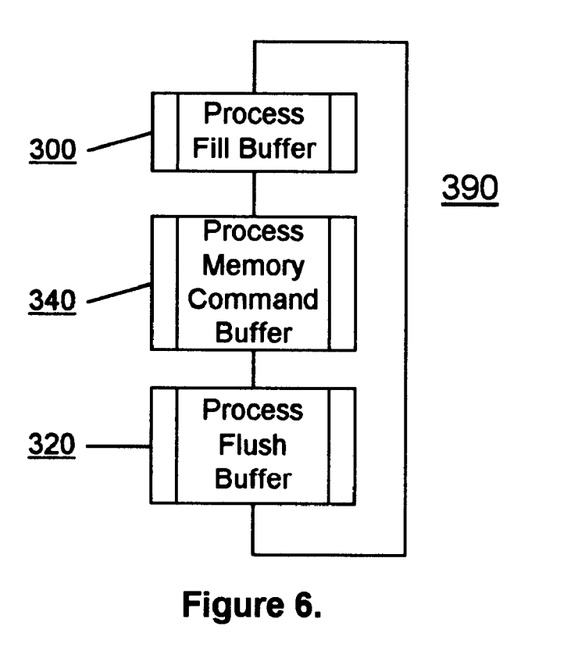
FIG. 6 illustrates a flow chart for controlling the processing of fill, flush, and memory commands in accordance with this invention.

Flow charts for the processing of commands from the buffers 280, 290, and 270, by the memory controller 260 are shown in FIGS. 3, 4, and 5, respectively. As is evident to one of ordinary skill in the art, the functional blocks shown in each of the figures of this specification can be implemented in hardware, software, firmware, or any combination thereof. The memory controller 260 will extract the commands from each buffer independently, thus the processing of the commands from each are shown as independent processes 300, 320, and 340. FIG. 6 shows a continual loop process 390, cycling though processes 300, 320, and 340. Note that for the process 390 to be deadlock-free, each process 300, 320, and 340, must be independent of each other. As shown, each process returns, independent of the actions taken within the process. That is, these processes do not contain a "wait" loop; each process either does or does not launch a sub-process, and then immediately returns, so that the other processes can be executed. Alternative non-blocking techniques, such as priority interrupt driven schemes, are known to those skilled in the art, and are within the spirit and scope of this invention. For example, because the fill command is independent of all others, the occurrence of a fill command could cause a priority interrupt to initiate a process similar to 300, regardless of what the other processes 320 and 340 are doing.

In the flow charts of FIGS. 3, 4, and 5, each command in each buffer 270, 280, 290 is identified as being unprocessed, processed, or completed. A processed command is one that has been processed by the memory control 260, such that the appropriate command was sent to the memory 100 or cache memory 130. When the memory 100 and cache memory 130 complete this command, it is identified as being completed.

FIG. 3 shows the processing 300 of fill commands. If any prior fill commands have been completed, at 302, they will be removed from the fill buffer 280, at 304. Each unprocessed fill command, if any, is processed by the loop 305–306. The associated memory block address and cache physical index are extracted from the command, at 310. A command is then issued by the memory control 260 to the memory 100 to download the contents of the associated memory block to the physical index location of the cache memory 130, at 312, and the entry in the fill buffer is marked as processed, at 314. Note that the execution of this block 312 is the submission of a command, not necessarily including a wait for the memory to complete the execution of this command. In this manner, the memory control 260 is free to continue without incurring the delay associated with the memory access. Subsequent unprocessed fill commands are processed 306, and the process returns, at 319. Steps 312–314 will be bypassed if the memory is unable to accept the command when submitted. In this case, the command is not marked as processed, and the loop 305–306 will be terminated. These unprocessed commands will be assessed each time process 300 is executed, until the memory is able to accept the command, and the command is marked as being processed.

FIG. 4 shows the processing 320 of flush commands. If any prior flush commands have been completed, at 322, they will be removed from the flush buffer, at 324. For each unprocessed flush command in the buffer 290, loop 325–326 is executed. The associated memory block address and cache physical index are extracted from the command, using the same process 310 as in FIG. 3. Because a flush command should not be executed until all writes to the cache location at this physical index have been completed, the memory command buffer 270 is checked to assure that no writes to this cache location are pending, at 330. If there are writes pending, the process bypasses steps 332–334. If there are no writes pending, a command is submitted to the memory 100 to transfer the contents of cache location at the physical index to the associated memory block, at 332, and the entry is marked as processed, at 334. As in process 300, if the memory 100 cannot accommodate the command to transfer to memory, steps 332–334 are bypassed, and the command is reprocessed each time process 320 is executed, until the memory 100 is able to accept the command.

FIG. 5 shows the processing 340 of memory commands, i.e. reads and writes submitted by the client process 110. At 345, the process includes determining if there is an entry in the command buffer. Memory commands are processed one at a time, in sequential order, because the client process is expecting the data to appear on the data bus 111 in the order in which it was requested by the read commands, and to place data on the data bus 111 in the order provided by the write commands, based on the command stream 115. Typically, the client process 110 will contain a FIFO for receiving data read from the memory, and a FIFO for transmitting data to be written to the memory. Data coherency is maintained by providing or accessing data to and from these FIFOs in the order provided by the command stream 115. The client process halts when there are no entries in the receive FIFO, and waits as required for the requested data. The client process will not be halted for writes unless the transmitting FIFO becomes full. By providing a sufficiently large transmit FIFO, the client process can minimize the possibility of being halted for writes.

The oldest entry in the memory command buffer 270 is accessed, at 350, and the memory block address and cache physical index is extracted, at 310. If the entry is a write command, at 355, the memory control 260 checks the fill buffer to determine if a fill to the cache location at the physical index is pending 360. If a fill is pending, the process returns, at 379. As noted above, if modified data is marked, and fills do not overwrite modified data, the check at 355, can be skipped. If this check is skipped, or if there are no fills pending, the data on the data bus, typically from a transmit FIFO in the client process 110, is stored to the cache location at the physical index, at 362. Note that this is a complete operation, not the spawning of a process by the issuance of a command. In this manner, the next commands from the memory command buffer can be executed with assurance that data coherency is maintained. If the entry is a read command, at 355, the memory control 260 checks the fill buffer to determine if a fill to the cache location at the physical index is pending 370. If a fill is pending, the process returns, at 379. If a fill is not pending, the data from the cache location at the physical index is provided to the data bus 111, at 372. After executing the read or write command, the entry is removed from the memory command buffer 270, at 368, and the process returns, at 379. Note that if the transfer between the cache location and the data bus is slow, the entries in the memory command buffer can contain a 'completed' flag. The blocks 362, 372 will spawn the appropriate transfer command, and return; the entry will be removed from the buffer when the operation is completed and the completed flag set, as in FIGS. 3 and 4.

Figure 7:
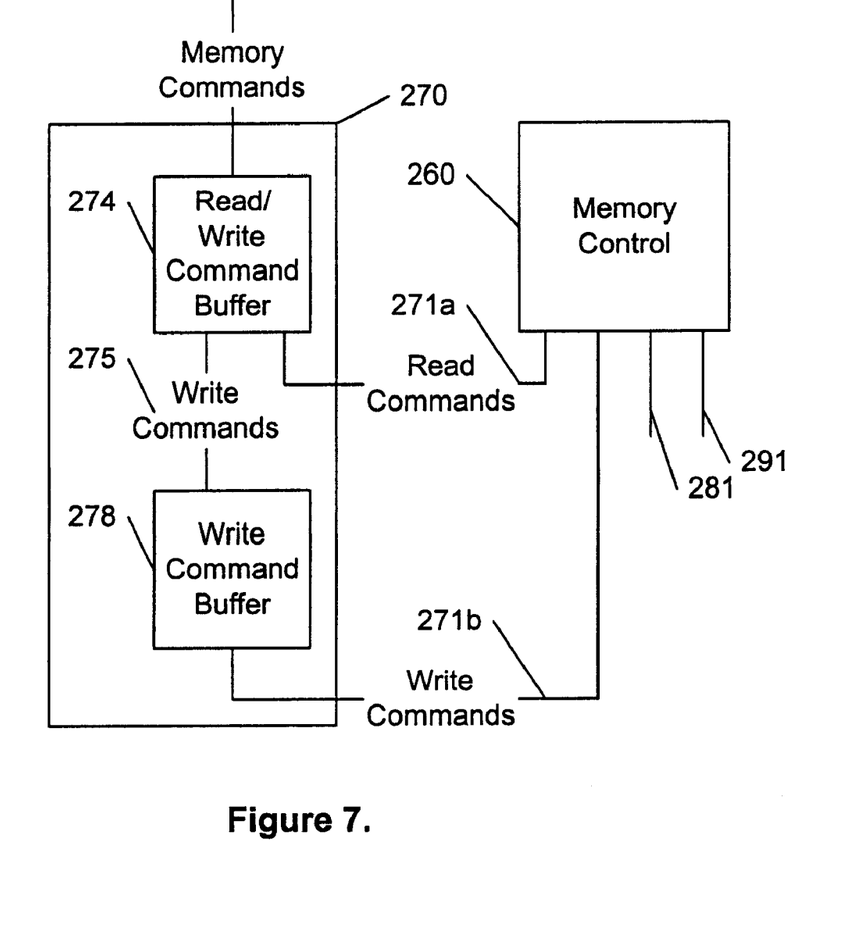
FIG. 7 illustrates a block diagram of a memory command buffer in accordance with this invention.

In another embodiment, the memory command buffer 270 is structured as two sequential buffers, a read/write command buffer 274 and a write command buffer 278, as shown in FIG. 7. This structure may include a data bus having a separate transmit and receive path connected to the transmit FIFO and receive FIFO.

Because read commands are dependent upon prior write commands, read and write commands are placed in the read/write command buffer 274, in the order in which they arrive. That is, the read/write command buffer 274 is a FIFO. The read/write command buffer 274 is processed by the memory control 260, via 271a, in the same manner as the previously described memory control buffer 270 with respect to read commands, as detailed in FIG. 5. Write commands, on the other hand, are placed directly into the write buffer 278, via 275, when they appear at the output of the read/write FIFO.

As discussed above, write commands are generally dependent upon fills to the same cache location. By passing write commands directly to a write buffer, any delays in write command processing will not necessarily impact subsequent read commands. Each read command, when it appears at the output of the read/write command buffer 274, will check the write command buffer 278 for writes to the cache location at its physical index. If there are no writes to the same cache location, the read is executed immediately. Thus, delays in write commands only affect subsequent reads that address the same cache location. Delays in write commands in the memory command buffer 270 of FIG. 2, on the other hand, affect all operations in the buffer, because commands are not processed until the write command is completed and removed from the buffer. The write commands are processed by the memory control 260, via 271b, in the same manner as those from the memory command buffer 270, via 271 in FIG. 2, as detailed in FIG. 5.

As discussed above, flush commands are dependent upon pending write commands. By providing a separate write command buffer 278, the search for pending write commands by the memory control 260, at step 330 in FIG. 4, is also simplified.

Other optimizations can also be realized, as would be evident to one of ordinary skill in the art. For example, if the transfer of the write command to the write command buffer 278 also includes the storage of the data on the data bus to the write command buffer 278, then the processing of write commands from the write command buffer 278 need not be sequential. In this manner, for example, a write command which has subsequent reads which may be delayed by this write, or dependent flushes which may be delayed, can be given priority over other write commands.

Figure 8:
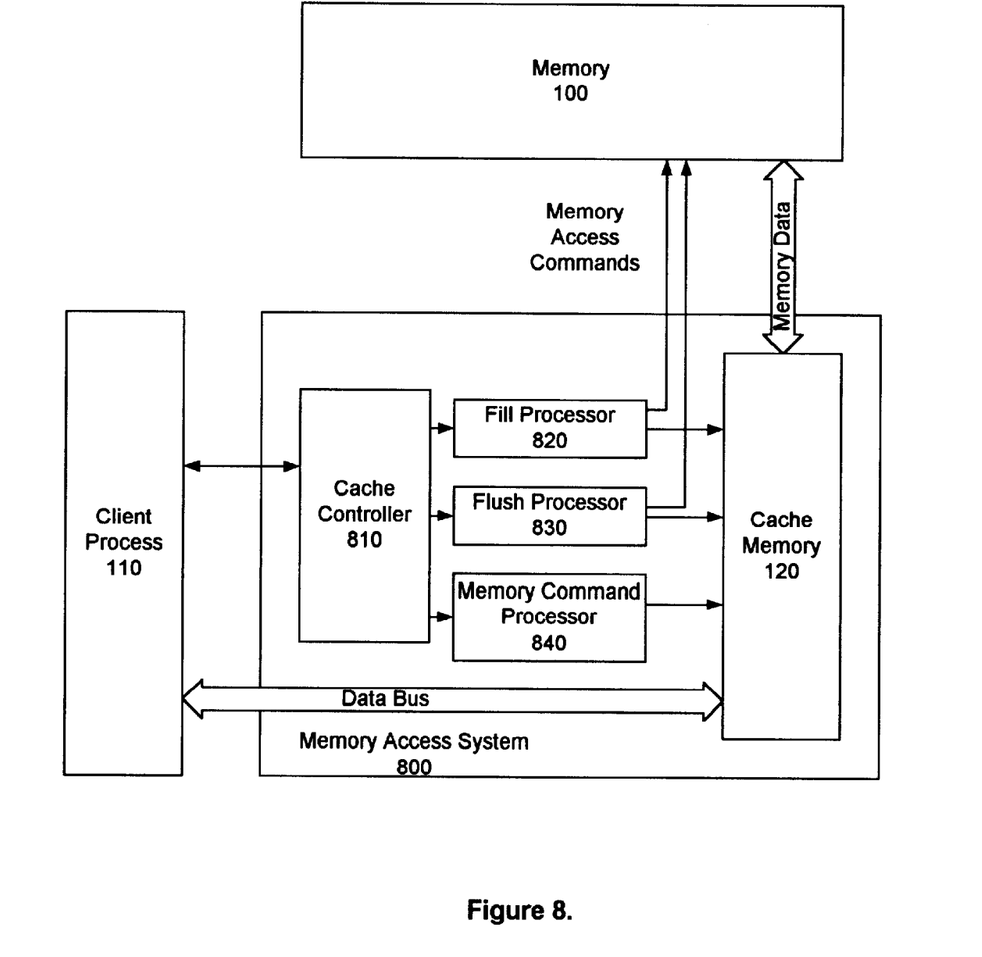
FIG. 8 illustrates another block diagram of a cache memory access system in accordance with this invention.

The foregoing discussion has described a method and apparatus for assuring cache coherency while allowing for the parallel processing of memory access commands. It will thus be appreciated that those of ordinary skill in the art will be able to devise various arrangements which, although not explicitly described or shown herein, embody the principles of the invention and are thus within its spirit and scope. For example, the fill, flush, and memory command buffers need not be discrete buffers. These buffers may be implemented as virtual buffers, accessed via independent pointers or linked lists. Similarly, as shown in FIG. 8, the memory access system 800 may have the memory control 260 distributed, such that the fill 280, flush 290, and memory 270 command buffers are fill 820, flush 830, and memory command 840 processors, comprising the aforementioned buffers 270, 280, 290, as well as the relevant portion of the memory control 260 to control these buffer. As discussed above, the command processing, cache allocation, and command routing can be performed in a single cache controller 810, also shown in FIG. 8. Alternatively, the distributed fill, flush, and memory command processors 820, 830, 840 could each process fill, flush and memory commands located in a single buffer (not shown) in the cache controller 810, thereby creating virtual fill, flush, and memory command buffers by ignoring the commands not relevant to the particular processor. These and other memory management and processing techniques are common to one of ordinary skill in the art, and are within the spirit and scope of this invention.

I claim:

1. A memory access system comprising:

a memory that includes a plurality of memory blocks, a cache memory that includes a plurality of cache locations, a cache controller operably coupled to receive client commands from a client process, wherein the cache controller generates fill commands, flush commands, and memory commands, based on the client commands;

a fill processor operably coupled to process the fill commands and store a source memory block of the plurality of memory blocks into a destination cache location of the plurality of cache locations;

a flush processor operably coupled to process the flush commands and store a source cache location of the plurality of cache locations into a destination memory block of the plurality of memory blocks;

a memory command processor operably coupled to process the memory commands and transfer a data item to and from a cache location of the plurality of cache locations from and to the client process; and wherein the processing of the memory commands by the memory command processor is dependent upon the fill commands in the fill buffer, and independent of the flush commands in the flush buffer.

2. The memory access system of claim 1, wherein:

the fill processor includes a fill buffer that temporarily stores the fill commands, the flush processor includes a flush buffer that temporarily stores the flush commands, and the memory command processor includes a memory command buffer that temporarily stores the memory commands.

3. The memory access system of claim 2, wherein the processing of the flush commands by the flush processor is dependent upon the memory commands in the memory command buffer, and independent of the fill commands in the fill buffer.

4. The memory access system of claim 2, wherein the memory commands include read commands and write commands;

the memory command buffer includes a read/write command buffer and a write command buffer;

the read commands in the read/write command buffer are processed by the memory command processor;

the write commands in the read/write command buffer are stored in the write command buffer; and, the memory command processor processes the write commands in the write command buffer independent of the memory commands in the read/write command buffer.

5. The memory access system of claim 4, wherein the processing of the flush command is dependent upon the write commands, and independent of the read commands.

6. The memory access system of claim 4, wherein the processing of at least one of the fill commands by the memory control is dependent upon:

at least one of the read commands in the memory command buffer having a first cache location, and at least one of the fill commands in the fill buffer also having the first cache location.

7. The memory access system of claim 1, wherein the fill commands, the flush commands, and the memory commands each include an associated cache location, and the cache controller further includes a deallocation buffer for storing a selected cache location of the plurality of cache locations and an associated block address corresponding to one of the plurality of memory blocks, and wherein the selected cache location and associated block address is removed from the deallocation buffer when the fill commands in the fill buffer, the flush commands in the flush buffer and the memory commands in the memory command buffer no longer contain the selected cache location as the associated cache location.

8. The memory access system of claim 7, wherein the selected cache location and associated block address is removed from the deallocation buffer when the cache controller generates at least one of the fill commands, the flush commands, or the memory commands containing the select block address as the associated cache location.

9. The memory access system of claim 1, wherein:

the cache controller generates the fill commands, flush commands, and memory commands relative to a plurality of logical indexes, and the cache controller maintains a mapping of each of the plurality of logical indexes to a corresponding one of the plurality of cache locations, and wherein the quantity of the plurality of cache locations is greater than the quantity of the plurality of logical indexes.

10. The memory access system of claim 1, wherein the processing of the fill commands by the fill processor is given priority over the processing of the flush commands by the flush controller.

11. A processing system comprising:

a client process;

a memory that includes a plurality of blocks, a cache memory operably coupled to temporarily store at least some of the plurality of blocks at a plurality of cache locations in the cache memory;

an operation generator operably coupled to receive client commands from the client process, wherein each of the client commands includes a memory address associated with one of the plurality of blocks having a block address, and wherein the operation generator generates fill commands, flush commands, and memory commands based on the client commands, such that:

each of the fill commands includes the block address and the cache location to which the block of memory is to be stored,     each of thee flush commands includes the block address and the cache location from which the block of memory is to be stored, and     each of the memory commands includes a cache address relative to the cache location, corresponding to the memory address relative to the block address;

a fill buffer operably coupled to temporarily store the fill commands;

a memory command buffer operably coupled to temporarily store the memory commands;

a flush buffer operably coupled to temporarily store the flush commands;

a memory control operably coupled to the fill buffer, the flush buffer, and the memory command buffer to process the fill commands, the flush commands, and the memory commands, and, therefrom, effect a transfer of data to perform the data commands; and wherein the operation generator generates the fill commands, the flush commands, and the memory control commands in a first sequential order, and the memory control processes the fill commands, the flush commands, and the memory commands in a second sequential order.

12. The processing system of claim 11, wherein:

the memory commands are stored in the memory command buffer in a first memory command order, and the memory control processes the memory commands in the first memory command order.

13. The processing system of claim 11, wherein the client process includes a transmit buffer and a receive buffer for communicating data to and from the cache memory, and the memory commands include read commands and write commands, and wherein the memory control:

processes the read commands so as to effect the transfer of data from the cache memory to the receive buffer, and     processes the write commands so as to effect the transfer of data from the transmit buffer to the cache memory.

14. The processing system of claim 13, wherein the operation generator generates the memory commands in a first sequential order, and the memory control processes the memory commands in a second sequential order.

15. A method of memory access comprising the steps of:

receiving client commands from a client process;

generating fill commands, flush commands, and memory commands, based on the client commands;

storing the fill commands in a fill buffer;

storing the flush commands in a flush buffer;

storing the memory commands in a memory command buffer;

processing the fill commands to store a source memory block of a plurality of memory blocks into a destination cache location of a plurality of cache locations;

processing the flush commands to store a source cache location of the plurality of cache locations into a destination memory block of the plurality of memory blocks;

processing the memory commands to transfer a data item to and from a cache location of the plurality of cache locations from and to the client process;

wherein processing of the fill commands is independent of the processing of the flush commands and independent of the processing of the memory commands; and the processing of the memory commands is dependent upon the processing of the fill commands.

16. The method of claim 15, wherein the processing of the fill commands is independent of the processing of the flush commands and independent of the processing of the memory commands.

17. The method of claim 16, wherein the processing of the flush commands is dependent upon the processing of the memory commands.

18. The method of claim 17, wherein the processing of the flush commands is independent of the processing of the fill commands.

19. The method of claim 15, wherein the client commands are received from the client process in a first sequential order; and the processing of the fill commands, the flush commands, and the memory commands is in a second sequential order.

20. A memory access system comprising:

a memory that includes a plurality of memory blocks, a cache memory that includes a plurality of cache locations, a cache controller operably coupled to receive client commands from a client process, wherein the cache controller generates fill commands, flush commands, and memory commands, based on the client commands;

a fill processor operably coupled to process the fill commands and store a source memory block of the plurality of memory blocks into a destination cache location of the plurality of cache locations;

a flush processor operably coupled to process the flush commands and store a source cache location of the plurality of cache locations into a destination memory block of the plurality of memory blocks; and a memory command processor operably coupled to process the memory commands and transfer a data item to and from a cache location of the plurality of cache locations from and to the client process; and wherein the cache controller generates the fill commands and the flush commands in a sequential order, and the processing of the fill commands and the flush commands are independent of the sequential order generated by the cache controller.

21. The memory access system of claim 20, wherein:

the fill processor includes a fill buffer that temporarily stores the fill commands, the flush processor includes a flush buffer that temporarily stores the flush commands, and the memory command processor includes a memory command buffer that temporarily stores the memory commands.

22. A processing system comprising:

a client process;

a memory that includes a plurality of blocks, a cache memory operably coupled to temporarily store at least some of the plurality of blocks at a plurality of cache locations in the cache memory;

an operation generator operably coupled to receive client commands from the client process, wherein each of the client commands includes a memory address associated with one of the plurality of blocks having a block address, and wherein the operation generator generates fill commands, flush commands, and memory commands based on the client commands, such that:

each of the fill commands includes the block address and the cache location to which the block of memory is to be stored, each of thee flush commands includes the block address and the cache location from which the block of memory is to be stored, and each of the memory commands includes a cache address relative to the cache location, corresponding to the memory address relative to the block address;

a fill buffer operably coupled to temporarily store the fill commands;

a memory command buffer operably coupled to temporarily store the memory commands;

a flush buffer operably coupled to temporarily store the flush commands;

a memory control operably coupled to the fill buffer, the flush buffer, and the memory command buffer to process the fill commands, the flush commands, and the memory commands, and, therefrom, effect a transfer of data to perform the data commands; and wherein the client process includes a transmit buffer and a receive buffer for communicating data to and from the cache memory, and the memory commands include read commands and write commands, and wherein the memory control:

processes the read commands so as to effect the transfer of data from the cache memory to the receive buffer, and processes the write commands so as to effect the transfer of data from the transmit buffer to the cache memory.

23. A method of memory access comprising the steps of:

receiving client commands from a client process;

generating fill commands, flush commands, and memory commands, based on the client commands;

storing the fill commands in a fill buffer;

storing the flush commands in a flush buffer;

storing the memory commands in a memory command buffer;

processing the fill commands to store a source memory block of a plurality of memory blocks into a destination cache location of a plurality of cache locations;

processing the flush commands to store a source cache location of the plurality of cache locations into a destination memory block of the plurality of memory blocks;

processing the memory commands to transfer a data item to and from a cache location of the plurality of cache locations from and to the client process;

wherein the client commands are received from the client process in a first sequential order; and the processing of the fill commands, the flush commands, and the memory commands is in a second sequential order.

* * * * *